May 6, 1969 W. B. WILLIAMS 3,441,962

FLOAT MARKER

Filed July 21, 1967

INVENTOR
WILLARD B. WILLIAMS
BY
Mason, Mason & Albright
ATTORNEYS 3,441,962
FLOAT MARKER
Willard B. Williams, Dogwood Lane,
West Middlesex, Pa. 16159
Filed July 21, 1967, Ser. No. 655,173
Int. Cl. B63b 21/52, 51/02; A01k 95/00
U.S. Cl. 9—9                                  7 Claims

ABSTRACT OF THE DISCLOSURE

This invention is a float marker composed of two sections and a horizontal rod which is passed through the approximate center of each section. A nut or other tightening means is secured on at least one end of the rod so that the sections can be placed in more or less close abutment with one another. One end of a line or other flexible means is secured to the marker, and the line is wound in convolutions about the rod between the sections. A weight is attached to the other end of the line so that when the marker float is jettisoned in the water, the line will pay out until the weight strikes bottom anchoring the float in place.

---

It is an object of the present invention to provide a marker float which will accurately and plainly indicate a spot in the water. It is another object to provide a marker that can be easily manufactured at low cost. These and other objects will be apparent from the following description.

Figure 1:
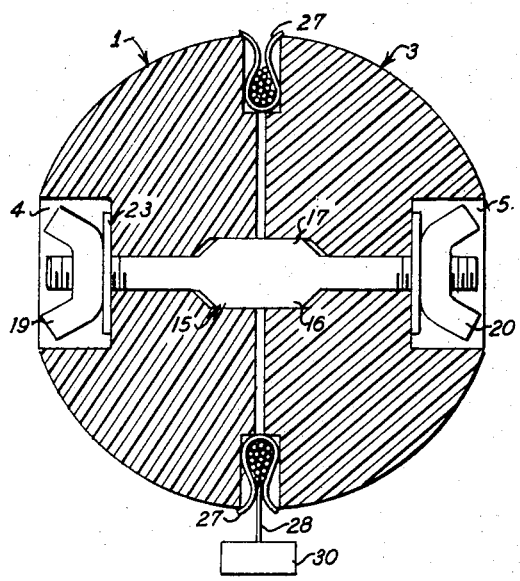
Figure 3:
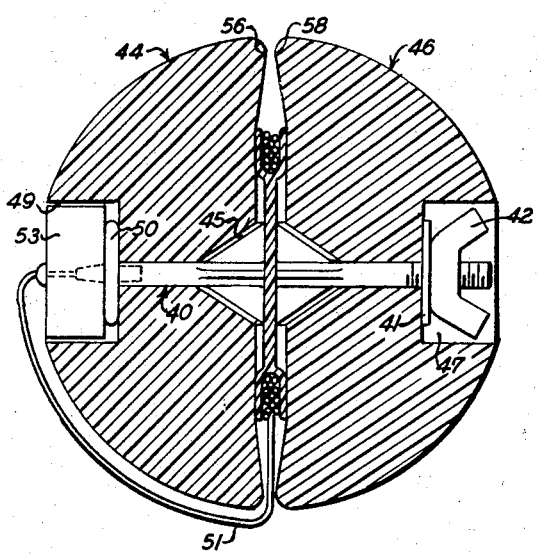
Figure 2:
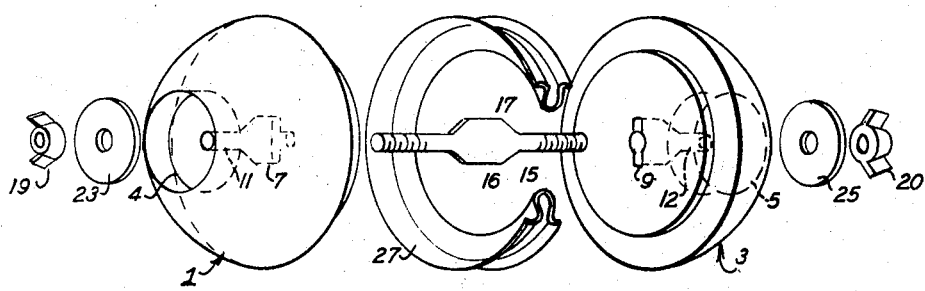

FIGURE 1 is a sectional view of the preferred marker
FIGURE 2 is an exploded view of the float marker showing the preferred parts.
FIGURE 3 is a sectional view of a modified float marker.

In FIGURES 1 and 2, two sections 1 and 3 of a buoyant material such as cork, wood, plastic or the like, are preferably identical in size and shape. Each section is provided at its outer periphery with a recess, 4 and 5, respectively. The recesses are located at the approximate apex or center of each section, and the sections are preferably hemispheres of luminescent material. A second recess, 7 and 9, is formed in each of the sections in the sides opposite from recesses 4 and 5 and passageways, 11 and 12, respectively, connect the corresponding recesses in each section.

A spline or rod 15 with flukes 16 and 17 is received in the recesses and the ends of the rod 15 are threaded so that wing nuts 19 and 20 can be tightened on rod 15 to urge sections 1 and 3 into close abutment. Washers 23 and 25 are fitted on rod 15 and a resilient liner ring 27 is received between sections 1 and 3 to house a line 28 having a weight 30 attached to one end. The other end of line 28 can be secured to ring 27, rod 15 or to some part on one of the sections. It will be appreciated that all of the parts should be made of corrosion resistant material so that the marker can be used in water for prolonged periods without attention.

In operation, a fisherman having located an active fishing spot and desiring to mark same, jettisons one of the float markers overboard. Having previously adjusted sections 1 and 3 to be in close abutment with one another, the line 28 is payed out from its storage space between the sections 1 and 3 overcoming the frictional engagement of the line by abutting sections 1 and 3. As line 28 is payed out, the marker is rotated until weight 30 strikes the bottom of the water. Owing to the adjustment of nuts 19 and 20, the sections 1 and 3 abut one another closely to pinch the liner ring 27 so that additional line will not be payed out without a substantial and extraordinary force acting on the marker. The high silhouette and luminescence of the marker readily identify the fishing spot marked.

In FIGURE 3, a one piece spool or reel 40 having threads at one end to receive washer 41 and nut 42 is fitted into a recess 45. Each section 44 and 46 has a recess 47 and 49, respectively, but the recess 49 of section 46 has a magnet 50 so that the weight 53 can be stored out of the way. When used, the weight 50 is separated from the magnet 49 and the entire marker is jettisoned at the desired fishing spot. Adjustment of the frictional engagement of sections 44 and 46 on line 51 in its storage space can be effected by tightening nut 42. Spool 40 can be flexible or resilient to reflect the compression applied to sections 44 and 46 or the abutting lips 56 and 58 respectively of sections 44 and 46 can overlap spool 40 to closely abut one another as seen in FIGURE 3. Thus the desired degree of friction can be made to bear on the line so that the line will pay out until its attached weight reaches the bottom. Thereafter the line will be restrained from further paying out owing to the frictional pressure exerted by the sections on the line.

While only several embodiments have been specifically disclosed herein, it will be appreciated that modifications of the marker will be obvious. Thus, the invention is not limited to the precise structures disclosed herein.

What is claimed is:
1. A float marker composed of two sections of buoyant material, normally horizontal rod means passing through the approximate center of each section, flexible means having one end attached to said marker between said sections, the other end of said flexible means secured to a weight, means for adjusting the relative position of at least one of said sections along said rod means whereby said flexible means can be wound in a storage space about said rod means between said sections, said flexible means being frictionally engaged in said storage space and pinched between said sections to a predetermined amount allowing said flexible means to be payed out under strain, said float marker being dimensioned to be rotatable in water.
2. The marker of claim 1, wherein a resilient spool for receiving said flexible means is positioned between said sections.
3. The marker of claim 1, wherein said rod means is a rod which is threaded to receive a nut at each end for adjusting the relative position of each section.
4. The marker of claim 1, wherein said rod means is provided with flukes which fit into recesses in said sections.
5. The marker of claim 1, wherein one of said sections has attaching means for retaining said weight in storage.
6. The marker of claim 5, wherein said weight is magnetically attractable and one of said sections has a magnet for retaining said weight in storage.
7. The marker of claim 1, wherein each section is a hemisphere of luminescent material.

References Cited

UNITED STATES PATENTS

| 832,881 | 10/1906 | Skinner | 9—9 |
| 2,601,736 | 7/1952 | Fisher | 43—43.11 |
| 3,340,644 | 9/1967 | Lintz | 43—43.11 |

TRYGVE M. BLIX, Primary Examiner.

U.S. Cl. X.R.
43—43.11